United States Patent [19]
Kenaga et al.

[11] 3,787,344
[45] Jan. 22, 1974

[54] HIGH BUFFING VINYL AROMATIC RESIN-WOOD COMPOSITES
[75] Inventors: Duane L. Kenaga; Richard H. Hall, both of Midland, Mich.
[73] Assignee: The Dow Chemical Company, Midland, Mich.
[22] Filed: Dec. 2, 1970
[21] Appl. No.: 94,621

[52] U.S. Cl......... 260/28.5 A, 117/148, 260/28.5 D, 260/33.6 UA
[51] Int. Cl...... C08f 45/28, C08f 45/52, B28k 3/50
[58] Field of Search............260/28.5 A, 28.5, 93.5, 260/33.6 UA; 117/148, 149

[56] References Cited
UNITED STATES PATENTS

| | | | |
|---|---|---|---|
| 3,061,457 | 10/1962 | Brown | 117/149 |
| 3,061,508 | 10/1962 | Morris, Jr. et al. | 117/149 |
| 3,077,419 | 2/1963 | Kenaga | 117/148 |
| 3,008,917 | 11/1961 | Park et al. | 117/148 |

OTHER PUBLICATIONS
Forest Products Journal, Vol. 15, 162, April, 1965.
Forrest Products Journal, Vol. 16, 47, August, 1966.

Primary Examiner—Morris Liebman
Assistant Examiner—S. L. Fox
Attorney, Agent, or Firm—Griswold & Burdick; Glwynn R. Baker; C. E. Rehberg

[57] ABSTRACT

A wood product having a self-polishing, lubricated, water-resistant surface and a method for accomplishing the same which method comprises impregnating wood with a solution of a vinyl aromatic monomer, a low melting wax, a cross-linking agent such as a dimethacrylate or diacrylate of a glycol or a polyglycol, divinylbenzene, dimethacrylate or a polyester of maleic anhydride with or without a catalyst, the impregnation being conducted after evacuation of the wood, the cure being accomplished by heating the wood to between about 80° and 150°C. for from 10 to 60 minutes.

5 Claims, No Drawings

HIGH BUFFING VINYL AROMATIC RESIN-WOOD COMPOSITES

BRIEF DESCRIPTION OF INVENTION

In accordance with the present invention, wood is impregnated either by first subjecting the wood to a vacuum then immersion in the impregnating solution under atmospheric or superatmospheric pressures, or merely subjecting the wood to immersion and subjecting the wood and solution to superatmospheric pressure. After removal of the wood from the solution, the wood is heated to between about 80° and 150°C. for from 10 to about 60 minutes. The resultant wood has a hard, smooth surface which can be buffed to a high gloss.

The impregnating solution comprises 1) a vinyl aromatic monomer such as styrene, vinyl toluene, t. alkyl styrenes, such as, tertiary butyl styrene, tertiary amyl styrene, tertiary hexyl styrene, tertiary octyl styrene; their ortho chloro and ortho bromo derivatives, such as, o-chlorostyrene, p-chlorostyrene or mixtures of o-, p-, and m-chlorostyrene, o-bromostyrene, p-bromostyrene or mixtures of o-, p-, and m-bromostyrene; chloro t. alkyl styrenes, such as, chloro t. butyl styrene, bromo t. butyl styrene, chloro t. amyl styrene, bromo t. amyl styrene, chloro t. hexyl styrene, bromo t. hexyl styrene, chloro t. octyl styrene, bromo t. octyl styrene; the mono and dichloro or bromo derivatives, such as, 2,4-dichlorostyrene, 2,3-dichlorostyrene, 2,5-dichlorostyrene, 3,4-dichlorostyrene, 3,5-dichlorostyrene, 2,4-dibromostyrene, 2,3-dibromostyrene, 2,5-dibromostyrene, 3,4-dibromostyrene and 3,5-dibromostyrene, or mixtures of these monomers, 2) a naturally occurring low melting wax, e.g., one melting below about 150° C. such as carnauba wax, beeswax, Nopco wax, paraffin wax, Japan wax, as well as oils such as paraffin oils, 3) a cross-linking agent, such as a glycol or polyglycol diacrylate (e.g., ethylene glycol dimethacrylate), divinylbenzene, dimethacrylate, a polyester of maleic anhydride, diallyl phthalate, triallyl citrate, diallyl maleate, diallyl fumarate, allyl acrylate, allyl methacrylate, diisopropenylbenzene and the like, and 4) a free radical catalyst such as tertiary butyl peroctoate, peroxide or axobisisobutyronitrile or the thermal equivalent thereof.

The curing time of the solution in the wood may vary depending on the particular monomer, cross-linking agent and/or catalyst employed but preferably is between 10 and 60 minutes at temperatures from 150° to about 60° C., respectively.

Good results are obtained when the monomer, wax, cross-linking agent and a catalyst are employed in ratios of from 180 to 30 to 10 to 1 respectively to 90 to 60 to 5 to 2 respectively.

The impregnation technique is either evacuation of the wood then immersion or submersion under atmospheric or superatmospheric pressure or mere immersion and submersion under superatmospheric pressure.

The temperature of impregnation is not critical but should be sufficient to maintain the impregnant solution liquid throughout the impregnation.

DETAILED DESCRIPTION OF INVENTION

Example 1

A ponderosa pine sapwood, 1½ inches by 1½ inches by 4 inches was subjected to a vacuum of 754 mm Hg (absolute pressure 6 mm Hg) for ten minutes. Thereafter, a solution of impregnant was allowed to flow into the vacuum chamber until the pressure in the chamber had risen to atmospheric pressure. The impregnating solution was:

| | |
|---|---|
| t-butylstyrene | 180 g. |
| 125°F. Paraffin wax | 60 g. |
| Ethylene glycol dimethacrylate | 20 g. |
| t-butyl peroctoate | 2 g. |

The block was allowed to soak in the solution for thirty minutes after which it was removed from the solution and placed in an oven. A thermocouple was imbedded in one end. The oven was heated to 90° C. and a rise in temperature to 140° C. of the internal portion of the block was observed during the 30 minutes the block was in the oven. The block was removed from the oven and sanded.

The surface of the block buffed to a pleasant sheen was more resistant to water spotting than a block heated with a solution similar to that set forth except it contained no paraffin wax.

In a similar manner, blocks were treated with a 25 percent by weight paraffin oil in t-butylstyrene, ethylene glycol dimethacrylate solution using the same catalyst to prepare cured blocks which had an oily feeling. Microscopic examination of the block revealed both oil and polymer throughout. Wood treated in this manner has utility as bearing blocks for slow moving shafts such as found in agricultural equipment.

Following the foregoing procedure, one can employ in place of the t-butylstyrene, ortho chloro-styrene, t-octyl styrene, t-amyl styrene, chloro t-butyl styrene or dichlorostyrene and obtain similar results.

Example 2

A number of maple pool cue tip blanks were subjected to a vacuum of 6 mm Hg for six minutes. A treating solution was introduced into the vacuum chamber and the vacuum released. The blanks were soaked for thirty minutes under atmospheric pressure. The treating solution contained:

11.76 pounds t-butylstyrene
0.63 pounds ethylene glycol diacrylate
0.03 pounds azobisisobutyronitrile, and
0.7 pounds Japan crude wax.

The blanks were removed and cured in a steam heated autoclave, 10 psig for 30 minutes.

Tests conducted by a manufacturer of pool cues indicated the so-prepared blanks were easily machined into cue tips, had nice grain figures and buffed easily. Compared with good low friction lacquer coated tips, the here-treated tips performed equally well in handling by a test panel of five individuals who were employed by the cue manufacturer to conduct tests.

The composition of the present invention also has utility as an impregnant for wood flooring, particularly that employed to build bowling alleys.

We claim:

1. A composition of matter for impregnating wood to impart a self-polishing, lubricated, water-resistant surface comprising from about 82 to about 57 percent of at least one vinyl aromatic monomer, from about 13 to about 38 percent by weight of a naturally occurring wax melting below about 150° C., or a petroleum oil, from about 3.5 to about 4.5 percent by weight of a cross-linking agent for the vinyl aromatic monomer, and, from about 0 to about 1.5 by weight of a catalyst or curing agent for said vinyl aromatic monomer.

2. The composition of claim 1 wherein monomer is t-butylstyrene, the cross-linking agent is divinyl benzene and the catalyst is azobisisobutyronitrile.

3. The composition of claim 2 wherein said wax is Japan crude wax.

4. The composition of claim 2 wherein said wax is paraffin wax.

5. The composition of claim 2 wherein said petroleum oil is paraffin oil.

* * * * *